US008315247B2

(12) United States Patent
Rosenberg

(10) Patent No.: US 8,315,247 B2
(45) Date of Patent: Nov. 20, 2012

(54) SYSTEM AND METHOD FOR PROVIDING REGISTRATION-COUPLED SUBSCRIPTIONS IN A SESSION INITIATION PROTOCOL (SIP) ENVIRONMENT

(75) Inventor: Jonathan D. Rosenberg, Freehold, NJ (US)

(73) Assignee: Cisco Technology Inc., San Jose, CA (US)

( * ) Notice: Subject to any disclaimer, the term of this patent is extended or adjusted under 35 U.S.C. 154(b) by 1371 days.

(21) Appl. No.: 11/456,284

(22) Filed: Jul. 10, 2006

(65) Prior Publication Data

US 2007/0011342 A1 Jan. 11, 2007

Related U.S. Application Data

(60) Provisional application No. 60/698,033, filed on Jul. 11, 2005.

(51) Int. Cl.
*H04L 12/66* (2006.01)
*H04J 3/24* (2006.01)
*G06F 17/00* (2006.01)

(52) U.S. Cl. ............ 370/352; 370/349; 726/1

(58) Field of Classification Search ............ 379/121.06; 370/352–356, 349; 455/432.1, 435.1; 726/1–3
See application file for complete search history.

(56) References Cited

U.S. PATENT DOCUMENTS

| 6,615,236 B2 | 9/2003 | Donovan et al. ............ 709/203 |
| 6,678,735 B1 | 1/2004 | Orton et al. ............ 709/230 |
| 2003/0108000 A1 | 6/2003 | Chaney et al. ............ 370/260 |
| 2003/0108002 A1 | 6/2003 | Chaney et al. ............ 370/261 |
| 2004/0028026 A1* | 2/2004 | McClung et al. ............ 370/352 |
| 2004/0121765 A1* | 6/2004 | Idnani et al. ............ 455/422.1 |
| 2004/0184452 A1* | 9/2004 | Huotari et al. ............ 370/384 |
| 2005/0125543 A1* | 6/2005 | Park et al. ............ 709/227 |
| 2005/0210104 A1* | 9/2005 | Torvinen ............ 709/205 |

FOREIGN PATENT DOCUMENTS

| WO | WO 2004/031972 A1 | 4/2004 |
| WO | WO 2004/059502 A1 | 7/2004 |

OTHER PUBLICATIONS

J. Rosenberg, SIP: Session Initiation Protocol (RFC 3261), Jun. 2002, Network Working Group.*
Rosenberg, "A Session Initiation Protocol (SIP) Event Package for Registrations," Network Working Group; Request for Comments: 3680, pp. 1-26, Mar. 2004.
Mahy, "A Message Summary and Message Waiting Indication Event Package for the Session Initiation Protocol (SIP)," Network Working Group; Request for Comments: 3842, pp. 1-19, Aug. 2004.
Idnani et al., "SIP Combined Registration and Subscription," Internet Engineering Task Force, XP15001281A, 9 pages, Oct. 2002.

* cited by examiner

*Primary Examiner* — Asad Nawaz
*Assistant Examiner* — Joel Hamel
(74) *Attorney, Agent, or Firm* — Baker Botts L.L.P.

(57) ABSTRACT

A system and method for coupling a subscription to a registration in a Session Initiation Protocol (SIP) environment includes creating a first registration-coupled subscription to initiate registration of a communication session and to initiate a subscription to an event package. The first registration-coupled subscription is transmitted, and a response is received to the first registration-coupled subscription, wherein the response confirms the subscription to the event package.

19 Claims, 3 Drawing Sheets

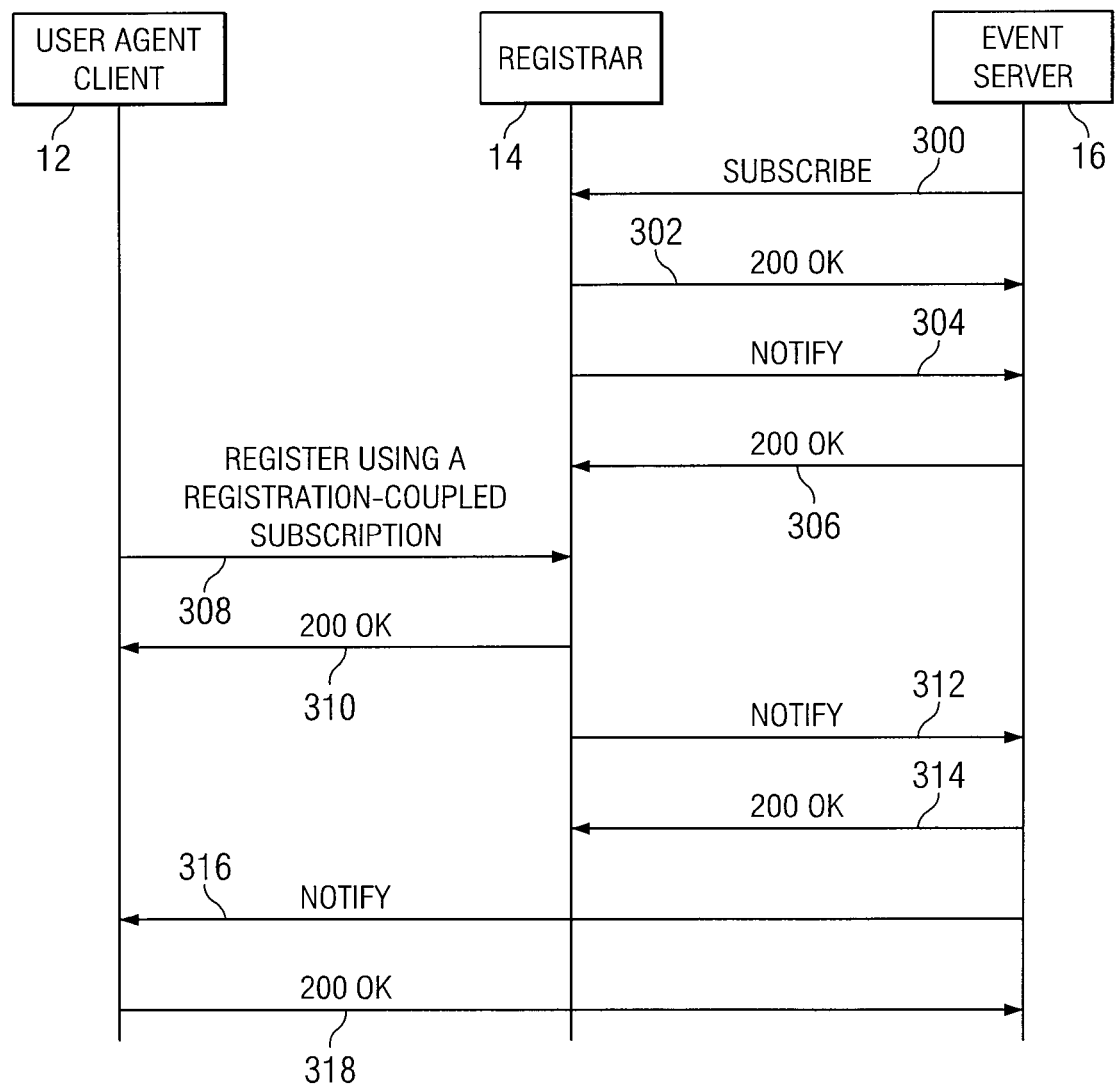

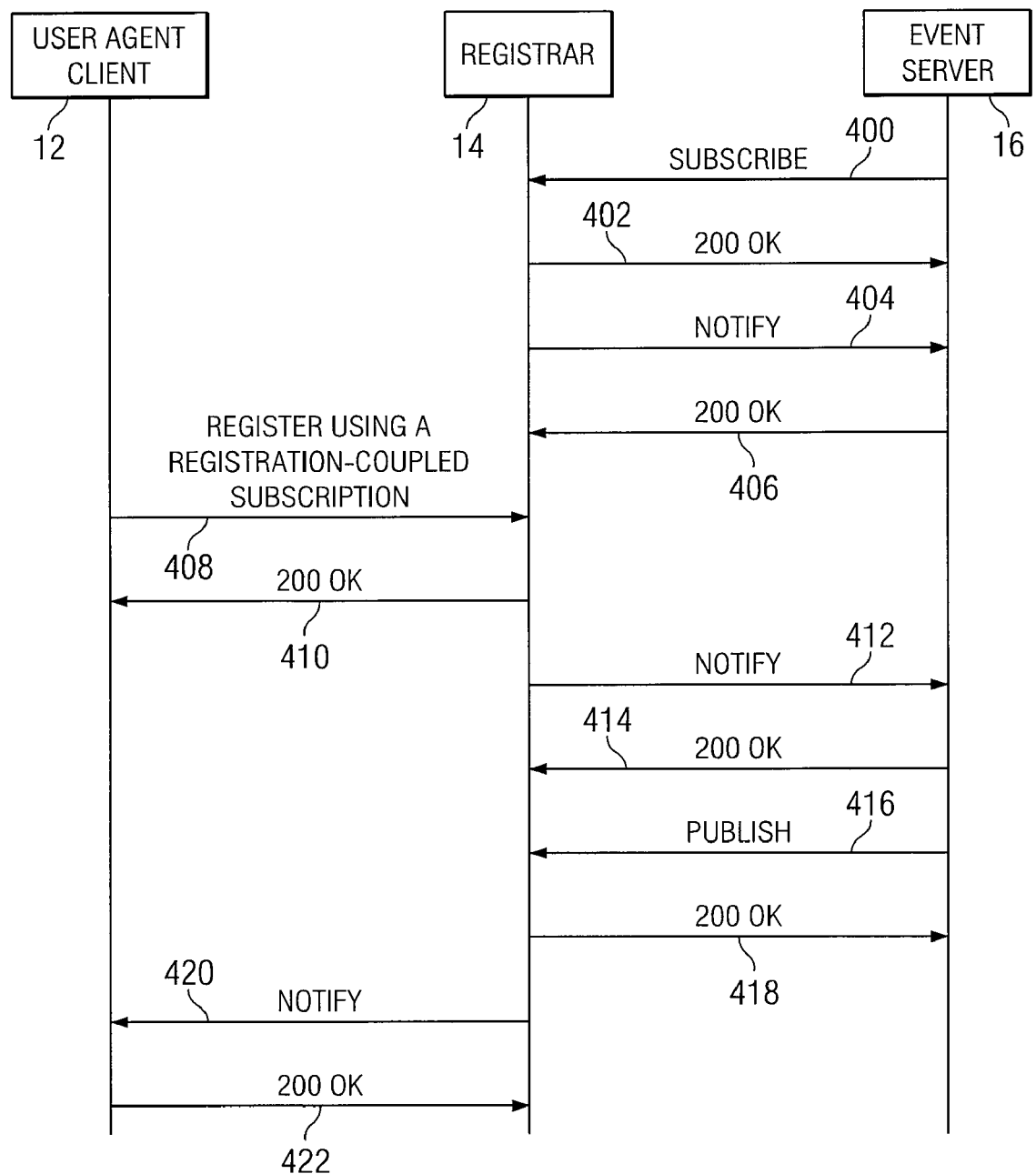

SYSTEM AND METHOD FOR PROVIDING REGISTRATION-COUPLED SUBSCRIPTIONS IN A SESSION INITIATION PROTOCOL (SIP) ENVIRONMENT

RELATED APPLICATION

This Application claims the benefit under 35 U.S.C. § 119(e) of U.S. Provisional Application Ser. No. 60/698,033 entitled: "Registration Coupled Subscriptions in the Session Initiation Protocol (SIP)," filed on Jul. 11, 2005 and incorporated by reference herein.

TECHNICAL FIELD OF THE INVENTION

This invention relates generally to the field of communications, and more specifically, to a system and method for providing registration-coupled subscriptions in a session initiation protocol (SIP) environment.

BACKGROUND

When a Session Initiation Protocol (SIP) user agent client (UAC) establishes a communication session, the UAC follows a series of message exchanges with servers in the network. First, the startup procedure involves a SIP registration with the servers. To subscribe to event packages during the communication session, the UAC sends a separate subscription message to the appropriate server. This traditional technique results in numerous messages between the UACs and the servers. Furthermore, each message may be periodically refreshed, which causes additional traffic.

The multitude of messaging is particularly ineffective during an avalanche restart that causes UACs to simultaneously re-register with the servers and re-subscribe to the event packages. The additional messages transmitted between the UACs and the servers cause the system to take longer to return to service. Furthermore, the multitude of messages also presents problems on wireless links and other interfaces where bandwidth is at a premium.

SUMMARY OF THE DISCLOSURE

From the foregoing, it may be appreciated by those skilled in the art that a need has arisen for an improved system and method to register with a server and subscribe to an event package. In accordance with the present invention, disadvantages and problems associated with conventional registration and subscription techniques may be reduced or eliminated.

According to one embodiment of the present invention, a system and method for coupling a subscription to a registration in a Session Initiation Protocol (SIP) environment includes creating a first registration-coupled subscription to initiate registration of a communication session and to initiate a subscription to an event package. The first registration-coupled subscription is transmitted, and a response is received to the first registration-coupled subscription, wherein the response confirms the subscription to the event package.

Certain embodiments of the invention may provide one or more technical advantages. A technical advantage of one embodiment includes reducing the number of messages between a UAC and a server. Because the subscription message is coupled to the registration message, the traffic between the UAC and the server is reduced. Another technical advantage of an embodiment includes providing a proper negotiation mechanism while reducing the number of messages. Traditional techniques that attempt to address the messaging traffic implement an unsolicited notification to lower traffic. However, this technique does not create and maintain proper subscriptions. The ability to manage the duration of a subscription, change authorization policies, terminate the subscription, and implement additional features do not exist using unsolicited notifications. Accordingly, creating a proper negotiation mechanism provides the UAC with the same capabilities as if the UAC used a traditional subscription technique. For example, the UACs may request to receive notifications for specific packages and resources, the servers may terminate subscriptions, authorization policies may change, and UACs may correlate a notification to a subscription, which allows multiple subscriptions to the same event package.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a call-flow diagram illustrating another embodiment of the registration-coupled subscription in which an event server holds ownership of the dialog; and FIG. 4 is a call-flow diagram illustrating another embodiment of the registration-coupled subscription in which a hybrid dialog ownership exists between the registrar and the event server.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
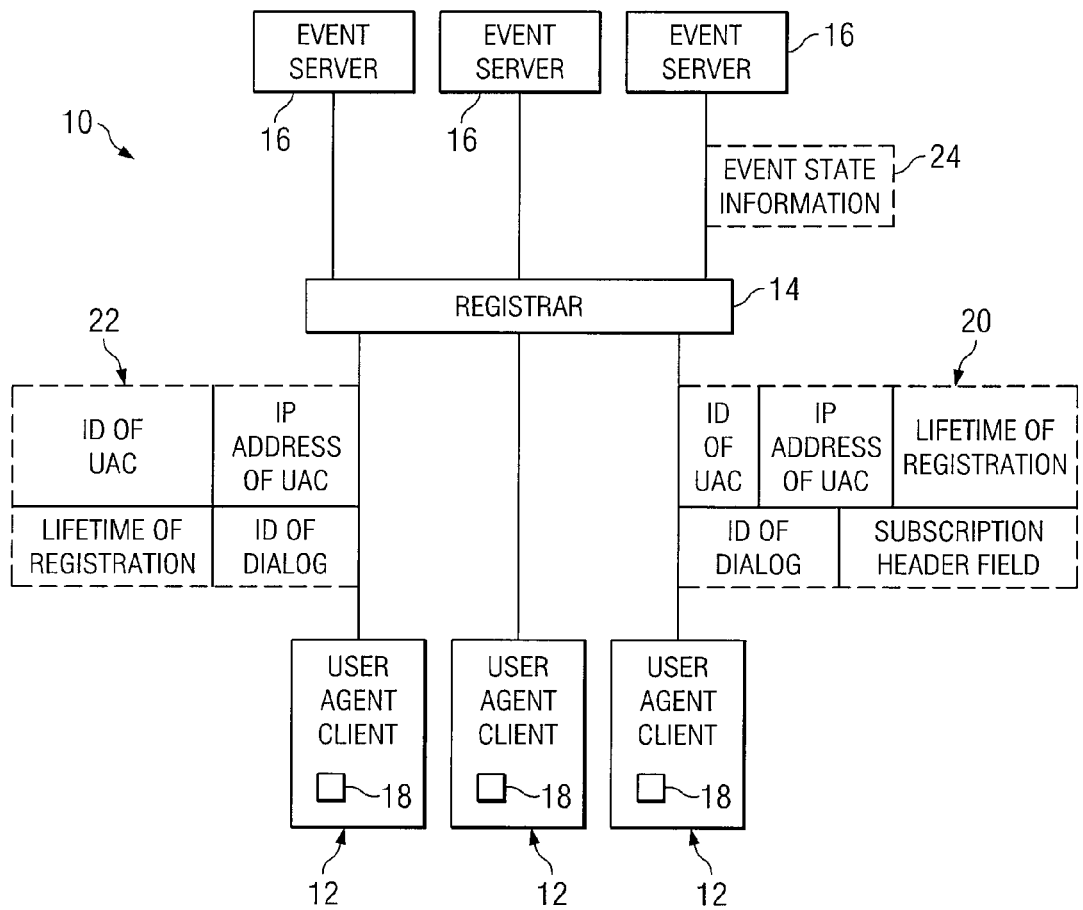
FIG. 1 is a block diagram illustrating a communication system that implements registration-coupled subscriptions in a SIP environment.

FIG. 1 is a block diagram illustrating a communication system 10 that implements registration-coupled subscriptions in a Session Initiation Protocol (SIP) environment. System 10 provides for communicating, receiving, and transmitting information during communication sessions. During initiation of a communication session and during the communication session, system 10 has less message traffic because of the registration-coupled subscriptions. Registration-coupled subscriptions provide for creating the subscription using the registration. System 10 includes a user agent client (UAC) 12 and a registrar 14 that facilitate the registration-coupled subscriptions.

Many applications require the creation and management of a communication session, where a session is considered an exchange of information between an association of participants. SIP supports several facets of establishing and terminating multimedia communications, including but not limited to: user location, user availability, user capabilities, session setup, and session management. The SIP features of system 10 enable UACs 12 to discover one another and to agree on a characterization of a session they would like to share. To locate prospective session participants, and for other functions, SIP enables the creation of an infrastructure of network hosts, such as registrar 14 and event servers 16, to which UACs 12 send registrations, invitations to sessions, subscriptions to event packages, and other requests.

UACs 12 establish communication sessions to communicate within system 10. To establish the communication session, UAC 12 sends a REGISTER message 20 to registrar 14. In addition to registering with registrar 14, UAC 12 may subscribe to event packages 18. In the illustrated embodiment, UAC 12 is configured with a set of event packages 18 to subscribe to.

Event packages 18 provide UAC 12 with useful information through the duration of the communication session. Such event packages 18 include message waiting, a registration event, a presence list, watcher information, dialog events, configuration events, and other information useful to UAC 12. The message waiting indication event package, as explained in Request for Comments (RFC) 3842, provides UAC 12 with an indication of a voicemail if messages are explicitly directed to the user's voicemail without ringing UAC 12. The registration event event package, as explained in RFC 3680, allows UAC 12 to learn the status of its registration. For example, with this event package, UAC 12 learns about removal of its registration from the network. The presence list event package provides UAC 12 with information about the presence of other users. The watcher information event package allows UAC 12 to receive information about attempts made to subscribe to its presence. The dialog events event package provides information about sessions of other UACs 12 in progress associated with the same address-of-record (AOR). The configuration events event package allows UAC 12 to learn about changes in its configuration.

In the illustrated embodiment, the messages between UAC 12 and registrar 14 are reduced to improve the amount of traffic. Traditionally, UAC 12 registers with registrar 14 using a REGISTER message and then subscribes to event package 18 using a separate SUBSCRIBE message. In system 10 as illustrated in FIG. 1, UAC 12 subscribes to one or more event packages 18 during its registration to registrar 14.

To create a registration-coupled subscription, UAC 12 includes a subscription header field in the REGISTER message 20. The subscription header field includes a list of the desired event packages 18 to subscribe to, and for each event package 18, the AOR for the target resource to which a subscription is desired and any event header field parameters. In an embodiment, the AOR is within the same domain as the domain of registration. In another embodiment, the AOR of the target resource is the same as the AOR for UAC 12.

REGISTER message 20 also includes the identification of UAC 12, the Internet Protocol (IP) address of UAC 12, the lifetime of the registration, the identification of the dialog, an event token of each event package 18 to which UAC 12 wants to subscribe, and additional parameters specific to processing the SIP request. The event token describes event package 18 for registrar 14 to set up the subscription.

The subscription exists as long as the registration exists, or UAC 12 may terminate a subscription prior to the expiration of the registration. To refresh the subscription, UAC 12 sends another registration-coupled subscription to registrar 14. A registration refresh occurs similarly to an initial registration. To terminate the subscription, UAC 12 omits event package 18 and resource from a subscription header field in REGISTER message 22, and the subscription ends.

UACs 12 are SIP-compatible elements that include hardware and/or software that receive and transmit information (directly or indirectly) and implement the registration-coupled subscription. UACs 12 represent any suitable device or infrastructure that may benefit from the operations of system 10. UACs 12 may include a personal computer, a laptop computer, an IP telephone, a standard telephone operable to interface with a computer, any other suitable device or element, or any suitable combination of the preceding that communicates information. Each UAC 12 may also include suitable network equipment and appropriate infrastructure, such as switches, routers, local area networks, and gateways to facilitate a SIP session.

Registrar 14 accepts requests from UACs 12 and event servers 16 to facilitate the communication session. Registrar 14 receives the registration-coupled subscription from UACs 12 and receives event information from event servers 16 to convey to subscribing UACs 12 in a NOTIFY message. When registrar 14 receives the registration-coupled subscription, registrar 14 checks for the presence of the subscription header field. Registrar 14 also determines if it supports registration-coupled subscriptions for the particular event package 18 in the request. For each event token value, it examines event package 18 and the target resource and determines whether the target resource is within the domain of registrar 14. Registrar 14 also determines whether the requesting UAC 12 is authorized to subscribe to the target resource.

Based on the request and information gathered during the examination, registrar 14 determines whether to create the subscription. Registrar 14 may honor the subscription or deny the subscription according to any suitable reason or policy. For example, if the target resource is in the domain of registrar 14, the target resource has an authorization policy of "self," and registrar 14 allows registration-coupled subscriptions for event package 18, then registrar 14 creates the subscription. As another example, if registrar 14 responds to the REGISTER request with a response that omits the requested event package and resource, the subscription is not established. Registrar 14 may also terminate the subscription after initially establishing the subscription.

If registrar 14 creates the subscription, registrar 14 stores the event header field in the subscription header field value as part of the state associated with the registered UAC 12. Registrar 14 also stores event package 18 to which UAC 12 subscribes. Registrar 14 provides notifications to UAC 12 based on the subscription. Even though UAC 12 subscribes to event packages 18 using a registration-coupled subscription, the notification is similar to a notification from registrar 14 as if UAC 12 had sent a separate subscription message. Accordingly, the registration-coupled subscription does not affect the notifications. Registrar 14 is any suitable SIP-compatible server that includes hardware and/or software operable to accept requests from other elements in system 10.

Event servers 16 provide event state information to registrar 14 for communication to UACs 12. Event servers 16 learn about events for event package 18 using any suitable technique. For example, event server 16 may use non-SIP techniques or SIP subscriptions to a resource to learn about events. In an embodiment, event server 16 provides the event state information to registrar 14 in a PUBLISH message 24. The event state information includes information that identifies the status of the event package in system 10. Event state information may include any suitable information that describes the location of the relevant user, the availability of the user, the reachability of the user, and/or the preferred modes of communication for the user for the purposes of communicating with other users. Examples of event state information include, but are not limited to, information indicating whether a user is currently logged into a particular network or component, information identifying an activity presently scheduled for the user, information identifying a waiting message, and information specifying a physical location of the user. Event servers 16 are any suitable SIP-compatible server that includes hardware and/or software operable to accept requests from other elements in system 10 and/or communicate with elements in system 10. For example, event server 16 is a message waiting indicator server that publishes message waiting indicator events.

In operation, UAC 12 registers with registrar 14 using a REGISTER message 20. Within the REGISTER message 20, UAC 12 includes an event token for each event package 18 from which UAC 12 desires to receive notifications. By including the subscription to event packages 18 within the registration, system 10 reduces the number of messages between UAC 12 and registrar 14. Registrar 14 determines whether to create the subscription. If registrar 14 cannot create the subscription for any suitable reason, an error may be returned to UAC 12. On the other hand, if registrar 14 creates the subscription, it informs UAC 12. Registrar 14 provides a notification to UAC 12 according to the subscription when event server 16 publishes the event state information to registrar 14.

Modifications, additions, or omissions may be made to system 10. For example, event servers 16 may receive the registration-coupled subscription directly from UAC 12. In this example, event servers 16 handle the subscriptions, the notifications, or any suitable combination of the preceding. As another example, system 10 may include any suitable number of UACs 12, registrars 14, and event servers 16. Moreover, the operations of system 10 may be performed by more, fewer, or other modules. Additionally, operations of system 10 may be performed using any suitable logic comprising software, hardware, other logic, or any suitable combination of the preceding.

Figure 2:
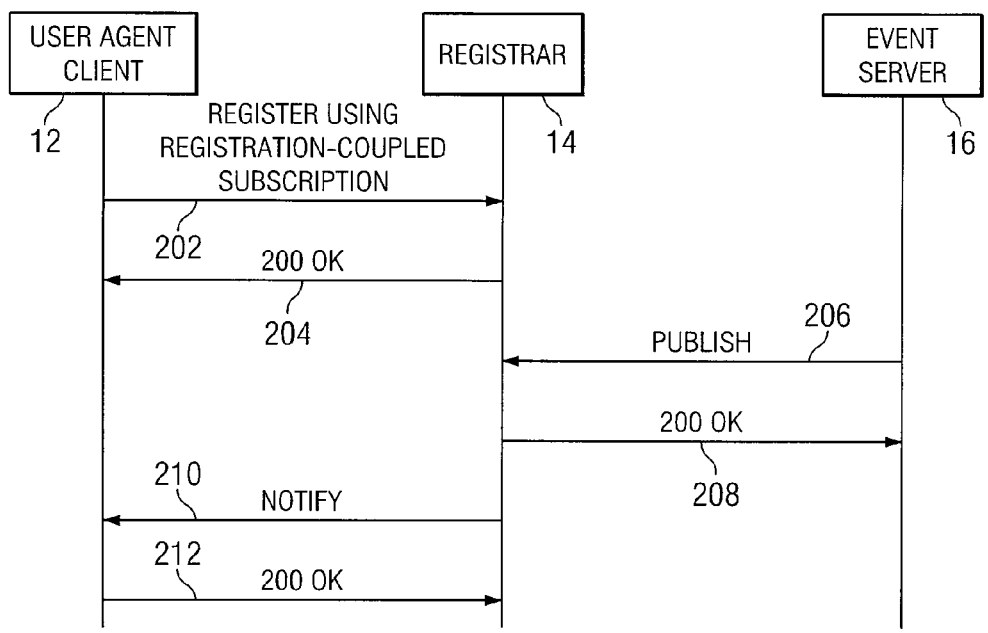
FIG. 2 is a call-flow diagram illustrating an embodiment of the registration-coupled subscription in which a registrar holds ownership of the dialog.

FIGS. 2, 3, and 4 illustrate call-flow diagrams within system 10 between UAC 12, registrar 14, and event server 16 with each call-flow diagram illustrating different components holding ownership of the dialog. A dialog is established by providing the dialog parameters through the registration and by making the dialog state part of the registration state. The dialog is refreshed and maintained similar to the registration state. If a user has multiple UACs 12 registered to the same AOR, multiple dialogs may be created and terminate on registrar 14.

Any suitable component may act as the dialog owner for any suitable reason. For example, if registrar 14 owns the dialog, registrar 14 performs registration queries and provides notifications without event state information to UAC 12. In this example, event server 16 may not need to maintain a state for each subscriber. In an embodiment, registrar 14 owns the dialog when infrequent events occur. As another example, event server 16 owns the dialog. In this example, the notification generated by event server 16 includes the event state information. In an embodiment, event server 16 owns the dialog when more frequent events occur. As yet another example, a hybrid ownership is available. For example, event server 16 provides event state information to registrar 14 in a PUBLISH message 24, and registrar 14 sends a notification to UAC 12 with the current event state information. In an embodiment, a hybrid model is useful for infrequent notifications that need to be triggered on registration. Additionally, the hybrid model provides for the features of event subscription without event server 16 needing to maintain the dialog state or per-subscriber subscription state.

FIG. 2 is a call-flow diagram illustrating an embodiment of the registration-coupled subscription in which registrar 14 holds ownership of the dialog. UAC 12 sends a REGISTER request to registrar 14 at message 202. The REGISTER request is a registration-coupled subscription that includes a subscription request to event packages 18 to which UAC 12 desires to subscribe. Registrar 14 may accept or reject the registration and/or subscription requests. Registrar 14 sends a 200 OK message to UAC 12, in response to the REGISTER request, at message 204 that contains an indication of whether the subscription was created. If the subscription is created, the 200 OK also includes the subscription header field and the remote tag needed to complete the dialog identifier. In another embodiment, registrar 14 does not create the subscription for any suitable reason, such as registrar 14 does not support the registration-coupled subscription or the registration-coupled subscription is not in use for event package 18 requested by UAC 12. If the subscription is denied, UAC 12 may proceed to establish a subscription using traditional mechanisms.

If a subscription is created using the registration-coupled subscription, UAC 12 creates a dialog and a subscription for each value of the subscription header field in the response received from registrar 14. To create the dialog, the dialog identifiers are obtained by copying the Call-ID and local tag from the REGISTER message, with the remote tag from the subscription header field value. The remote sequence number is taken from the subscription header field value, and the route set is taken as the service route.

Similarly, registrar 14 creates a subscription. The dialog identifiers and remote sequence number are set as described with the creation of the dialog. The route set is taken from the path header field of the registration.

Following messages 200 and 204, a proper subscription is established at UAC 12 and registrar 14. Now, registrar 14 may send a notification to UAC 12 at any time.

At message 206, event server 16 sends a PUBLISH message to registrar 14. Event server 16 may send a PUBLISH message at any suitable time based on any suitable parameters. For example, if event server 16 is a message waiting indicator server and a new message is received, event server 16 sends a PUBLISH message to registrar 14. The PUBLISH message is routed to registrar 14 and includes the AOR of UAC 12 for whom the notification is to be delivered. Registrar 14 determines whether the PUBLISH message has arrived from event server 16 that is authorized to publish events for UAC 12. Registrar 14 examines the uniform resource identifier (URI) in the PUBLISH message and sends a 200 OK response at message 208. In an embodiment, registrar 14 does not find a matching registration-coupled subscription for the PUBLISH message, registrar 14 generates a 403 response to the PUBLISH message, which informs event server 16 that the event was not delivered. Registrar 14 examines each registered contact to determine if the registration-coupled subscription includes the event package in the PUBLISH message. Because an established subscription exists, registrar 14 sends a NOTIFY to UAC 12 at message 210 that informs UAC 12 of the new event. The NOTIFY includes the event information from the PUBLISH message. UAC 12 sends a 200 OK response to registrar 14 at message 212.

Modifications, additions, or omissions may be made to the call-flow diagram. For example, the call-flow diagram may include more, fewer, or other messages. Additionally, messages may be performed in any suitable order.

FIG. 3 is a call-flow diagram illustrating another embodiment of the registration-coupled subscription in which event server 16 holds ownership of the dialog. Event server 16 sends a SUBSCRIBE request to registrar 14 at message 300. Event server 16 may send the request at any suitable time, for example, event server 16 sends the request at start up. Using the SUBSCRIBE request, event server 16 subscribes to the registration event package 18 at registrar 14. Therefore, event server 16 receives a notification when elements, such as UAC 12, register with registrar 14. In an embodiment, the URI of the request identifies all users in the domain. As another example, event server 16 subscribes to a registration event package 18 of a single UAC 12. Registrar 14 generates a 200 OK response. Registrar 14 sends the 200 OK response to event server 16 at message 302. Registrar 14 also sends a NOTIFY message to event server 16 at message 304 that confirms the subscription. Event server 16 responds by sending a 200 OK response to registrar 16 at message 306.

At any suitable time, UAC 12 registers with registrar 14. UAC 12 sends a REGISTER message to registrar 14 at message 308. The REGISTER message is a registration-coupled subscription that includes a request to subscribe to any suitable event package 18. Upon receipt of the request, registrar 14 replies in message 310 with a 200 OK response.

The receipt of the registration-coupled subscription prompts registrar 14 to send a NOTIFY message to event server 16 at message 312. The notification informs event server 16 that a registration-coupled subscription was created. Additionally, the notification provides the dialog identifiers to event server 16 to facilitate communication between event server 16 and UAC 12. Event server 16 replies to the notification by sending a 200 OK response to registrar 14 at message 314.

Event server 16 generates a NOTIFY message and sends the message to UAC 12 at message 316. The NOTIFY message includes event state information of the event package 18 subscribed to UAC 12 replies to the notification by sending a 200 OK response to event server 16 at message 318.

Modifications, additions, or omissions may be made to the call-flow diagram. For example, the call-flow diagram may include more, fewer, or other messages. Additionally, messages may be performed in any suitable order.

FIG. 4 is a call-flow diagram illustrating another embodiment of the registration-coupled subscription in which a hybrid dialog ownership exists between registrar 14 and event server 16. Event server 16 sends a SUBSCRIBE request to registrar 14 at message 400. Event server 16 may send the request at any suitable time, for example, event server 16 sends the request at start up. Using the SUBSCRIBE request, event server 16 subscribes to the registration event package 18 at registrar 14. Therefore, event server 16 receives a notification when elements, such as UAC 12, register with registrar 14. The URI of the request may identify all users in the domain. Registrar 14 generates a 200 OK response and sends the 200 OK response to event server 16 at message 402. Registrar 14 also sends a NOTIFY message to event server 16 at message 404 that confirms the subscription. Event server 16 responds by sending a 200 OK message to registrar 16 at message 406.

At any suitable time, UAC 12 registers with registrar 14. UAC 12 sends a REGISTER message to registrar 14 at message 408. The REGISTER message is a registration-coupled subscription that includes a request to subscribe to any suitable event package 18. Upon receipt of the request, registrar 14 replies in message 410 with a 200 OK response.

The receipt of the registration-coupled subscription prompts registrar 14 to send a NOTIFY message to event server 16 at message 412. The notification informs event server 16 that a registration-coupled subscription was created. Additionally, the notification provides the dialog identifiers to event server 16; however, event server 16 discards the dialog information because registrar 14 communicates with UAC 12 on behalf of event server 16. Event server 16 replies to the notification by sending a 200 OK response to registrar 14 at message 414.

Event server 16 sends a PUBLISH request at message 416 to registrar 414, and registrar 14 responds with a 200 OK response at message 418. Because of the established subscription, registrar 14 sends a NOTIFY to UAC 12 at message 420 that informs UAC 12 of the new event, and UAC 12 sends a 200 OK response to registrar 14 at message 422.

Modifications, additions, or omissions may be made to the call-flow diagram. For example, the call-flow diagram may include more, fewer, or other messages. Additionally, messages may be performed in any suitable order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for coupling a subscription to a registration in a Session Initiation Protocol (SIP) environment, comprising:
   creating, by a user agent client (UAC) having a processor, a first registration-coupled subscription to initiate registration of a communication session and to initiate a subscription to an event package, wherein creating the first registration-coupled subscription comprises generating a REGISTER message with a subscription header field that identifies a plurality of event packages with which to establish a subscription and identifies one or more resources associated with the plurality of event packages, the UAC and the resources having the same address-of-record (AOR), the resources having a self-authorization policy that authorizes the UAC to subscribe to events of the resources having the same AOR as the UAC, and the REGISTER message comprises an identification of a dialog, the dialog facilitates identification of a component that owns the dialog associated with the event package;
   transmitting the first registration-coupled subscription;
   receiving, at the UAC, a response to the first registration-coupled subscription, wherein the response confirms the registration of the communication session and the subscription to the event package;
   creating, by the UAC, a second registration-coupled subscription; and
   transmitting the second registration-coupled subscription to a registrar to refresh the registration and the subscription.

2. The method of claim 1, wherein transmitting the first registration-coupled subscription comprises transmitting the first registration-coupled subscription to a registrar.

3. The method of claim 1, further comprising receiving a notification from a registrar if a change occurs to the event package to which a subscription has been established.

4. The method of claim 1, further comprising receiving a notification from an event server if a change occurs to the event package to which a subscription has been established.

5. The method of claim 1, wherein the subscription exists for a duration equal to a duration of the registration.

6. The method of claim 1, wherein the REGISTER message comprises:
   an identification of a user agent client;
   an Internet Protocol address of the user agent client;
   a duration of the registration; and
   a subscription header field.

7. A communication system that facilitates communication using a registration-coupled subscription in a Session Initiation Protocol (SIP) environment, comprising:
   one or more user agent clients (UAC) having a processor, each UAC operable to:
      create a first registration-coupled subscription to initiate registration of a communication session and to initiate a subscription to an event package, wherein creating the first registration-coupled subscription comprises generating a REGISTER message with a subscription header field that identifies a plurality of event packages with which to establish a subscription and identifies one or more resources associated with the plurality of event packages, the UAC and the resources having the same address-of- record (AOR), the resources having a self-authorization policy that authorizes the UAC to subscribe to events of the resources having the same AOR as the UAC, and the REGISTER message comprises an identification of a dialog, the dialog facilitates identification of a component that owns the dialog associated with the event package;
      transmit the first registration-coupled subscription;
      receive a response to the first registration-coupled subscription, wherein the response confirms the registration of the communication session and the subscription to the event package;
   a registrar coupled to a UAC, the register operable to:
      receive the first registration-coupled subscription;
      establish the subscription to the event package; and
      send the response to the first registration-coupled subscription; and
   one or more event servers coupled to the registrar, each event server operable to provide event state information according to the event package, wherein the one or more UACs is further operable to:
      create a second registration-coupled subscription; and
      transmit the second registration-coupled subscription to the registrar to refresh the registration and the subscription.

8. The system of claim 7, wherein each user agent client is further operable to transmit the first registration-coupled subscription to a server, wherein the server is a selected one of the registrar and the event server.

9. The communication system of claim 7, wherein the event server is further operable to publish the event state information to the registrar, and the registrar is further operable to send a notification to the one or more UACs, the notification confirming the event state information received from the event server.

10. The communication system of claim 7, wherein the event server is further operable to:
   subscribe to an event package of the registrar that provides a first notification of the registration-coupled subscriptions subscribing to the event server;
   receive the first notification of the registration-coupled subscription; and
   transmit a second notification to the UAC subscribed to the event package, wherein the second notification confirms the event state information of the event package.

11. The communication system of claim 7, wherein the event server is further operable to:
   subscribe to an event package of the registrar that provides a first notification of the registration-coupled subscriptions subscribing to the event server;
   receive the first notification of the registration-coupled subscription; and
   publish the event state information of the event package to the registrar.

12. The communication system of claim 11, wherein the registrar is further operable to transmit a second notification to the one or more UACs subscribed to the event package, wherein the second notification confirms the event state information of the event package.

13. A non-transitory computer readable medium comprising logic for coupling a subscription to a registration in a Session Initiation Protocol (SIP) environment, the logic, when executed by a processor, operable to:
   create a first registration-coupled subscription to initiate registration of a communication session and to initiate a subscription to an event package, wherein creating the first registration-coupled subscription comprises generating a REGISTER message with a subscription header field that identifies a plurality of event packages with which to establish a subscription and identifies one or more resources associated with the plurality of event packages, the UAC and the resources having the same address-of- record (AOR), the resources having a self-authorization policy that authorizes the UAC to subscribe to events of the resources having the same AOR as the UAC, and the REGISTER message comprises an identification of a dialog, the dialog facilitates identification of a component that owns the dialog associated with the event package;
   transmit the first registration-coupled subscription;
   received a response to the first registration-coupled subscription, wherein the response confirms the registration of the communication session and the subscription to the event package;
   create a second registration-coupled subscription; and
   transmit the second registration-coupled subscription to a server to refresh the registration and the subscription.

14. The computer readable medium of claim 13, wherein transmitting the first registration-coupled subscription comprises transmitting the first registration-coupled subscription to a registrar.

15. The computer readable medium of claim 13, the logic further operable to receive a notification from a registrar if a change occurs to the event package to which a subscription has been established.

16. The computer readable medium of claim 13, the logic further operable to receive a notification from an event server if a change occurs to the event package to which a subscription has been established.

17. The computer readable medium of claim 13, wherein the subscription exists for a duration equal to a duration of the registration.

18. The computer readable medium of claim 13, wherein the REGISTER message comprises:
   an identification of a user agent client;
   an Internet Protocol address of the user agent client;
   a duration of the registration; and
   a subscription header field.

19. A system for coupling a subscription to a registration in a Session Initiation Protocol (SIP) environment, comprising:
   means for creating a first registration-coupled subscription to initiate registration of a communication session and to initiate a subscription to an event package, wherein creating the first registration-coupled subscription comprises generating a REGISTER message with a subscription header field that identifies a plurality of event packages with which to establish a subscription and identifies one or more resources associated with the plurality of event packages, the UAC and the resources having the same address-of-record (AOR), the resources having a self-authorization policy that authorizes the UAC to subscribe to events of the resources having the same AOR as the UAC, and the REGISTER message comprises an identification of a dialog, the dialog facilitates identification of a component that owns the dialog associated with the event package;

means for transmitting the first registration-coupled subscription;

means for receiving a response to the first registration-coupled subscription, wherein the response confirms the registration of the communication session and the subscription to the event package;

means for creating a second registration-coupled subscription; and means for transmitting the second registration-coupled subscription to a registrar to refresh the registration and the subscription.

* * * * *